Jan. 17, 1956　　　　D. DANIELS　　　　2,731,542
SEAT BACK WARMER
Filed April 15, 1955
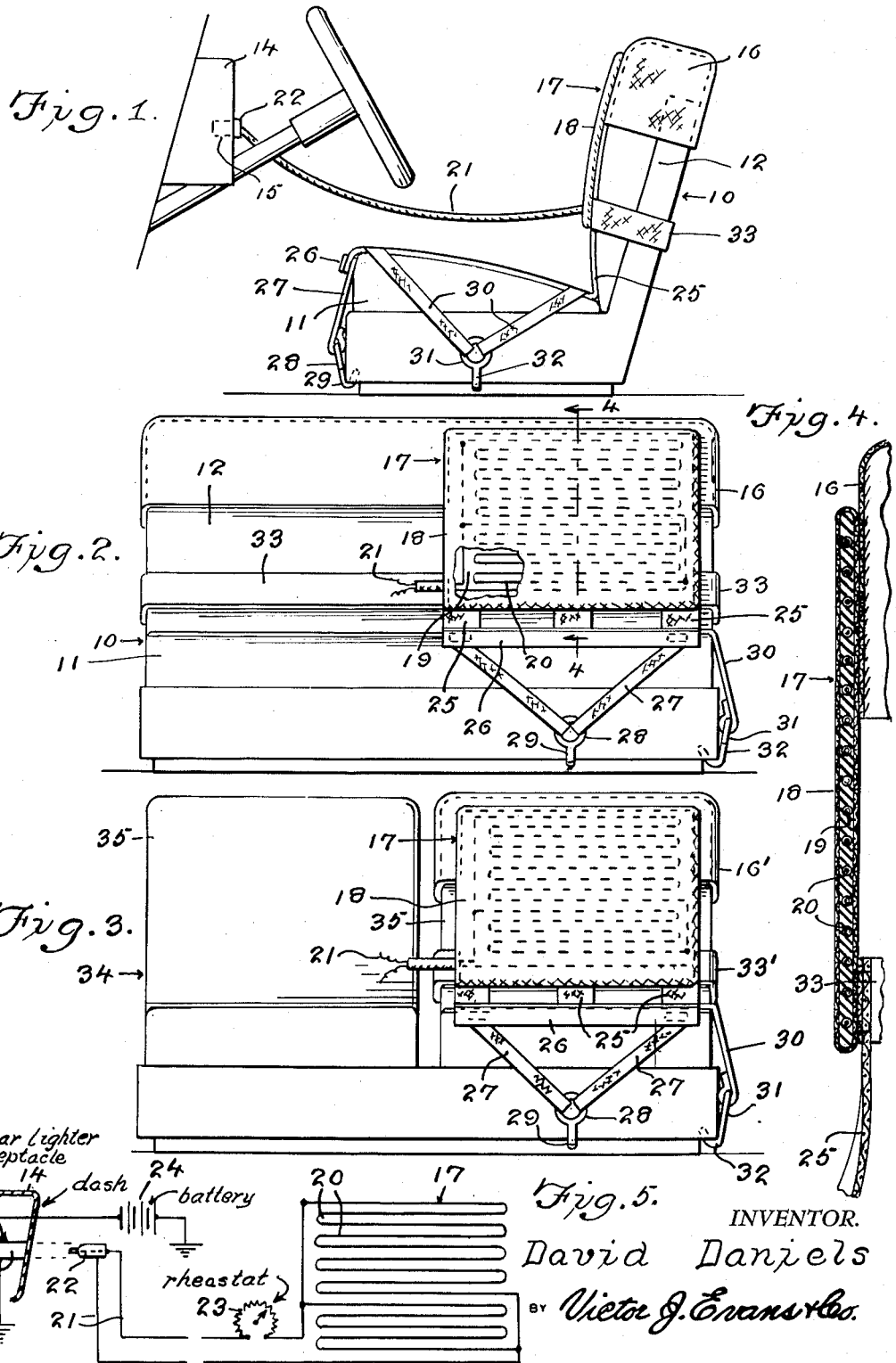
INVENTOR.
David Daniels
BY Victor J. Evans & Co.
ATTORNEYS

United States Patent Office 2,731,542
Patented Jan. 17, 1956

2,731,542
SEAT BACK WARMER

David Daniels, Kearny, N. J.

Application April 15, 1955, Serial No. 501,507

2 Claims. (Cl. 219—46)

This invention relates to a heater, and more particularly to a device for heating or warming the seat or back rest of a vehicle.

The object of the invention is to provide a heater which will effectively warm the back portion of a vehicle seat so that a person can use the seat with greater comfort and without impairing his or her health.

Another object of the invention is to provide a seat warmer for a vehicle such as an automobile whereby the device can be readily attached to or removed from the seat, and whereby the heater will not accidentally slip out of place and whereby the heater can be connected to a suitable source of electrical energy such as the vehicle battery through the medium of the cigarette lighter receptacle on the dashboard of the vehicle.

A further object of the invention is to provide a vehicle seat warmer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view illustrating the heater of the present invention mounted on a seat and back rest.

Figure 2 is a front elevational view of the seat with the heater thereon and with parts broken away and in section.

Figure 3 is a view similar to Figure 2 but illustrating a modification wherein the heater is mounted on a movable seat.

Figure 4 is a sectional view taken on the line 4—4 of Figure 2.

Figure 5 is a schematic view illustrating the wiring diagram for the present invention.

Referring in detail to the drawings, the numeral 10 designates a vehicle seat of a vehicle such as an automobile or truck, and the seat 10 is of conventional construction and includes a lower portion or base 11 and a back portion or back rest 12, Figure 1. The numeral 14 designates a portion of the vehicle dashboard and the dashboard 14 may be provided with a cigar or cigarette lighter receptacle 15.

The heater of the present invention includes a casing 16 which is adapted to engage the upper portion of the back rest 12, and a pad 17 is secured to the casing 16 in any suitable manner, as for example by means of stitching. The heating pad 17 includes an outer cover 18, there being insulated material 19 arranged in the cover 18, the heating pad 17 including heating elements or resistance wires 20, Figure 4. Wires or conductors 21 lead from the pad 17, and a plug 22 serves to connect the wires 21 to a suitable source of electrical energy, such as the cigarette lighter receptacle 15, Figure 5. The numeral 24 designates a suitable source of electrical energy such as the vehicle battery, and the numeral 23 designates a suitable rheostat which can be used for controlling the temperature of the heating pad 17.

A means is provided for securing the heater in place on the seat so that the heater will not accidentally move from its proper position. This means comprises a plurality of straps 25 which may be secured to the pad 17 in any suitable manner, as for example by means of stitching, and the straps 25 may have a cross member 26 secured thereto. A pair of angularly arranged straps 27 extend from the cross member 26 and are arranged in engagement with a ring 28, there being a hook 29 extending from the ring 28 for engagement with the bottom of the base 11. A pair of angularly arranged straps 30 may extend from a side of the device, Figure 1, and the straps 30 may have their lower ends arranged in engagement with a ring 31 from which extends a hook 32 for engagement with the bottom of the base 11. A band 33 straddles the back rest 12 of the seat 10, and the band 33 may be made of rubber or the like.

Referring to Figure 3 of the drawings there is shown a modification for use with a seat 34 of the type that includes a pair of movable or swingable back rests 35. Thus, the heater of Figure 3 may include a casing 16' which is of smaller size than the casing 16, and the band 33' is also used, the band 33' being smaller than the band 33.

From the foregoing it is apparent that there has been provided a heater which is especially suitable for use in warming the back portion or back rest of a vehicle seat such as the seat of an automobile. In use the heater may be mounted on the seat 10 as shown in the drawings by placing the casing 16 over the upper portion of the back rest 12. The hook 32 and the hook 29 can be arranged in engagement with the bottom of the base 11 whereby the heater will be retained in place. Then, the user can sit on the seat and lean back against the pad 17. The wires 21 lead to the plug 22 which can be arranged in engagement with the receptacle 15 after the cigarette lighter has been removed from the receptacle 15. The electrical energy will thus pass from the battery 24 through the receptacle 15, then through the plug 22, then through the wires 21 and to the heating elements 20 which are arranged within the pad 17. When the heater is not being used, it can be readily removed by disengaging the hooks 29 and 32 from the base, and then disengaging the casing 16 and rubber band 33 from the back rest 12. The heater shown in Figure 3 is adapted to be used when it is mounted on seats having movable back rests 35 and it is to be noted that the casing and band of Figure 3 are smaller than the casing and band shown in Figures 1, 2 and 4.

With the present invention vehicles such as automobiles which have been parked outside for long periods of time or overnight during the winter, will have warm seats or back rests so that persons using the vehicle can ride in comfort. Also, persons suffering from back ailments can receive beneficial results from the heat emanating from the pad 17. The heater can be disconnected when not being used and the heater may be incorporated in the seat cover of the vehicle. The parts can be made of any suitable material and of any desired shape and size. The cover 18 for the pad 17 may be made of asbestos or the like. A suitable pad may also be provided on the upper surface of the base 11 if desired.

The seat back heating element will serve to take the chill out of the backrest and to warm the back of the driver until the entire car is warmed up. Then, the heating element can be disconnected if it is not necessary and the heating element can again be connected up whenever the driver deems it necessary for reason of comfort or for medical benefits.

It is to be understood that the present invention is a seat back warmer. The seat back warmer will also cover and save wear on the regular seat cover while in use through the winter months.

I claim:

1. In a heater for a vehicle seat of the type including a base and a back rest, a casing arranged over the upper end of said back rest, a heating pad secured to said casing and arranged contiguous to the front surface of said back rest, a band secured to said pad and surrounding said back rest, a plurality of spaced parallel straps secured to said pad, a crosspiece secured to said straps, a pair of strap members arranged in conveging relation with respect to each other and secured to said crosspiece, a ring connected to said strap members, a hook extending from said ring for engagement with said base, straps extending from the side of the heater, a ring arranged in engagement with said last named straps, and a hook extending from said last named ring for engagement with the base of the seat, straps extending from the side of the heater, a ring arranged in engagement with said last named straps, a hook extending from said last named ring for engagement with the base of the seat, said pad including an outer cover, insulating material arranged in said cover, heating elements embedded in said insulated material, wires extending from the pad and connected to said heating elements, a rheostat connected to said wires, a plug connected to said wires and adapted to be arranged in engagement with the lighter receptacle of the vehicle, said band being made of yieldable material.

2. In a seat back warmer, in combination with a vehicle seat of the type including a base and a back rest, a casing arranged over the upper end of said back rest, a heating pad secured to said casing and arranged contiguous to the front surface of said back rest, a band secured to said pad and surrounding said back rest, a plurality of straps secured to said pad, a crosspiece secured to said straps, a pair of strap members secured to said crosspiece, a ring connected to said strap members, a hook extending from said ring for engagement with said base, straps extending from said heater, a ring arranged in engagement with said last named straps, a hook extending from said last named ring for engagement with the base of the seat, straps extending from the side of the heater, a ring arranged in engagement with said last named straps, a hook extending from said last named ring for engagement with the base of the seat, said pad including an outer cover, insulating material arranged in said cover, heating elements embedded in said insulated material, wires extending from the pad and connected to said heating elements, a rheostat connected to said wires, a plug connected to said wires and adapted to be arranged in engagement with the lighter receptacle of the vehicle.

References Cited in the file of this patent

UNITED STATES PATENTS

| | | |
|---|---|---|
| 1,288,397 | Eberle | Dec. 17, 1918 |
| 1,994,759 | Dermott | Mar. 19, 1935 |
| 2,025,621 | Soule | Dec. 24, 1935 |
| 2,498,983 | D'Albora | Feb. 28, 1950 |
| 2,581,888 | Schlegel et al. | Jan. 8, 1952 |
| 2,698,893 | Ballard | Jan. 4, 1955 |